United States Patent [19]

Clancey

[11] 4,281,750
[45] Aug. 4, 1981

[54] FLUID COUPLING DEVICE HAVING IMPROVED RESPONSE TIME

[75] Inventor: Stephen M. Clancey, Battle Creek, Mich.

[73] Assignee: Eaton Corporation, Cleveland, Ohio

[21] Appl. No.: 13,578

[22] Filed: Feb. 21, 1979

[51] Int. Cl.³ ...................... F16D 35/00; F16D 43/25
[52] U.S. Cl. .................................. 192/58 B; 192/82 T
[58] Field of Search ........................... 192/58 B, 82 T

[56] References Cited

U.S. PATENT DOCUMENTS

| | | | |
|---|---|---|---|
| 3,002,595 | 10/1961 | Weir | 192/58 B |
| 3,263,783 | 8/1966 | Sutaruk | 192/58 B |
| 3,403,764 | 10/1968 | Sutaruk | 192/58 B |
| 3,444,748 | 5/1969 | Sutaruk | 74/217 |
| 3,463,282 | 8/1969 | Fujita et al. | 192/58 B |
| 3,559,786 | 2/1971 | Long | 192/82 T X |
| 3,575,269 | 4/1971 | Sherman | 192/58 B X |
| 3,584,716 | 6/1971 | Coty | 192/58 B |
| 3,688,884 | 9/1972 | Perrin et al. | 192/58 B |
| 3,741,359 | 6/1973 | Leichliter | 192/58 B |
| 3,865,221 | 12/1974 | Coty | 192/58 B |
| 3,972,399 | 8/1976 | Bopp | 192/58 B |
| 4,046,239 | 9/1977 | Tinholt | 192/58 B |
| 4,116,317 | 9/1978 | Streeter | 192/58 B |

*Primary Examiner*—Rodney H. Bonck
*Attorney, Agent, or Firm*—R. J. McCloskey; J. Yakimow; L. Kasper

[57] ABSTRACT

A fluid coupling device is disclosed of the type including an output coupling assembly (13) which defines a fluid operating chamber (37) and a fluid reservoir chamber (41). Rotatably disposed within the operating chamber is an input coupling member (11), including a disc-like portion (31), which defines rearward lands (61) and forward lands (65). The lands defined by the input coupling member cooperate with the lands (63 and 67) defined by the output coupling assembly to define rearward and forward shear spaces, operable to transmit torque from the input member to the output assembly. The disc-like portion defines a plurality of fluid passages (71) which communicate between the inner and outer radial peripheries of the disc-like portion, and also communicate with both the forward and rearward shear spaces. During filling, fluid flows radially outward through the fluid passages, and directly into the shear spaces, to substantially reduce the response time of the coupling device.

13 Claims, 4 Drawing Figures

FLUID COUPLING DEVICE HAVING IMPROVED RESPONSE TIME

BACKGROUND OF THE DISCLOSURE

The present invention relates to fluid coupling devices, and more particularly, to such devices which are capable of changing between an engaged condition and a disengaged condition, in response to variations in a predetermined condition, such as engine compartment temperature.

A fluid coupling device of the type to which the present invention relates typically includes an input coupling member, and an output coupling assembly. The output assembly defines a reservoir chamber and an operating chamber, and the input member is rotatably disposed in the operating chamber. The forward and rearward surfaces of the input member, and the adjacent surfaces of the output assembly, cooperate to define a plurality of interdigitated lands and grooves, thus providing forward and rearward shear spaces.

In a typical fluid coupling device of the type to which the present invention relates, the output assembly includes a valving arrangement operable in response to variations in a condition, such as temperature, to permit fluid to flow from the reservoir chamber into the operating chamber, normally at a location disposed radially inward from the shear spaces. It is also typical to provide some form of pumping element disposed near the outer periphery of the operating chamber, operable to pump a small quantity of fluid from the operating chamber back into the reservoir chamber.

In prior art coupling devices of the type having both forward and rearward lands and grooves, filling of the forward and rearward shear spaces has normally been aided by a plurality of radially-extending grooves formed both on the opposite faces of the input member, and also on the adjacent surfaces of the output assembly.

One of the problems associated with fluid coupling devices of the type described above relates to the characteristic known as "response time". As used herein, the term "response time" refers to the ability of the coupling device to go from the fully disengaged condition to the fully engaged condition in a rapid and predictable manner. By way of example, when the coupling device is being used to drive the radiator cooling fan of a vehicle engine, it is important that, when the ambient air reaches the temperature at which the valving begins to open, the fluid entering the operating chamber is able to fill the shear space quickly enough. If the response time is too long, the engine may overheat, indicating to the vehicle operator that there is a malfunction in the cooling system, possibly necessitating shut down of the vehicle.

It should be noted here that the above-mentioned problem cannot be solved merely by lowering the temperature at which the fluid coupling device begins to engage. It would then be likely that, after initial engagement, the device would not subsequently disengage, thereby partially losing one of the primary benefits of using such devices for driving radiator cooling fans, i.e., the horsepower savings which occur when the device disengages.

SUMMARY OF THE INVENTION

Accordingly, it is an object of the present invention to provide a fluid coupling device of the type described in which the response time of the device is substantially reduced.

It is a more specific object of the present invention to provide a fluid coupling device which achieves the above-stated object by providing a fluid flow path for filling of the shear space, other than the shear space itself, which presents relatively lower restriction to fluid flow, while permitting direct access to the shear space over most of the radial extent of the shear space.

The above and other objects of the present invention are accomplished by the provision of an improved fluid coupling device of the type described herein. The fluid coupling device comprises a first rotatable coupling assembly defining a fluid operating chamber and a fluid reservoir chamber. A second rotatable coupling is disposed in the fluid operating chamber and includes a hub portion and a disc-like portion, the disc-like portion having first and second axially-spaced surfaces. The first surface cooperates with the adjacent surface of the first coupling assembly to define a first viscous shear space, and the second surface cooperates with the adjacent surface of the first coupling assembly to define a second viscous shear space. The disc-like portion defines at least one fluid passage communicating between the inner radial periphery of the disc-like portion and the outer radial periphery thereof. The fluid passage communicates at least intermittently with each of the first and second viscous shear spaces over at least a major portion of the radial extent of the shear spaces.

In accordance with a more limited aspect of the present invention, the first and second axially-spaced surfaces of the disc-like portion, and the adjacent surfaces of the first coupling assembly form a plurality of interdigitated lands which define the first and second viscous shear spaces, respectively. Preferably, the fluid passage defined by the disc-like portion is in open communication with the grooves defined by the lands which are formed by the disc-like portion.

DESCRIPTION OF THE PREFERRED EMBODIMENT

Figure 1:
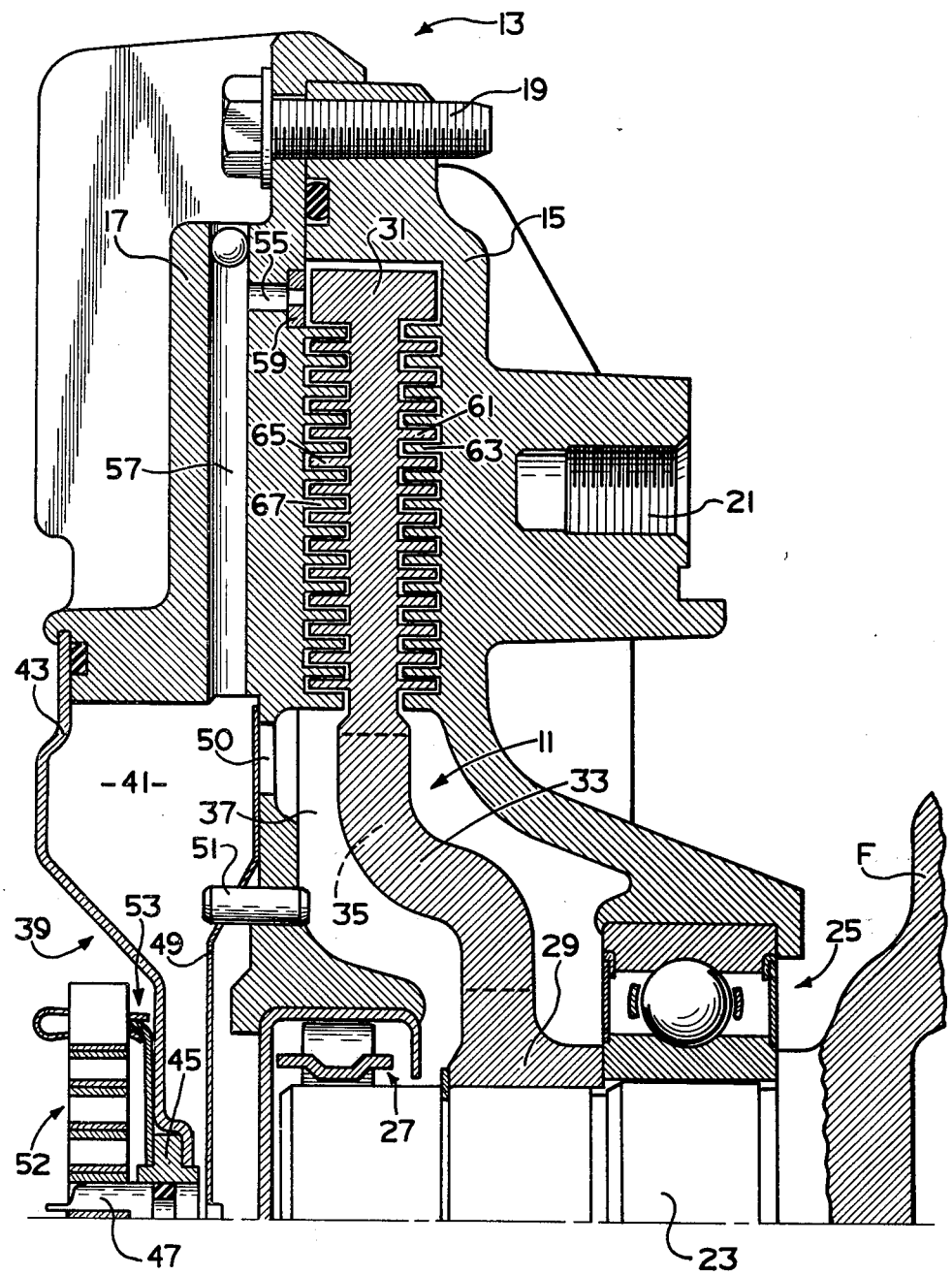
FIG. 1 is an axial cross section illustrating the upper half of a typical fluid coupling device of the type which can utilize the present invention.

Referring now to the drawings, which are not intended to limit the invention, FIG. 1 illustrates one preferred form of a fluid coupling device of the type in which the present invention may be utilized. The fluid coupling device includes an input coupling member, generally designated 11, and an output coupling assembly, generally designated 13. The output coupling assembly 13 includes a cast metal housing member 15 and a cast metal cover member 17, the members 15 and 17 being secured together by a plurality of bolts 19. The fluid coupling device of the present invention is adapted to be driven by a liquid cooled engine, and in turn, drives an automotive engine accessory, such as a radiator cooling fan. The fan (not shown) may be bolted to the housing member 15 by means of a plurality of threaded bores 21 formed in the member 15. It will be understood, however, that the use of the present invention is not limited to any particular fluid coupling device configuration or application, except as specifically noted hereinafter.

The fluid coupling device includes an input shaft 23 on which the input coupling member 11 is mounted. The input shaft 23 is rotatably drive, typically by means of a flange F which may be bolted to the flange of an engine water pump (not shown). The input shaft 23 functions as a support for the inner race of a bearing set 25, which is seated on the inside diameter of the housing member 15. The forward end (left end in FIG. 1) of the input shaft 23 serves as the inner race for a roller bearing set, generally designated 27, which is seated on the inside diameter of the cover member 17.

The input coupling member 11 is generally annular and includes a hub portion 29 and an annular, disc-like portion 31. Extending radially between the hub portion 29 and disc-like portion 31 is a web portion 33 which, in the subject embodiment, defines three openings 35 (see FIGS. 2 and 3), which are uniformly spaced in the circumferential direction. The hub portion 29 is pressed onto an intermediate portion of the input shaft 23, such that rotation of the input shaft 23 causes rotation of the input coupling member 11.

The housing member 15 and the cover member 17 cooperate to define a fluid operating chamber 37, within which the input coupling member 11 is rotatably disposed. The cover member 17 cooperates with a cover assembly, generally designated 39, to define a fluid reservoir chamber 41 therebetween.

The cover assembly 39 includes a stamped cover member 43 defining a central aperture which receives a generally cylindrical insert member 45. Rotatably disposed within the insert member 45, and supported thereby, is a valve shaft 47, extending outwardly (to the left in FIG. 1) through the cover member 43. Attached to the inner end (right end in FIG. 1) of the valve shaft 47 is a valve arm 49, the general construction of which forms no part of the present invention, but may be better understood by reference to U.S. Pat. No. 3,055,473. Movement of the valve arm 49 controls the flow of fluid from the reservoir chamber 41 to the operating chamber 37, through a fill opening 50, formed in the cover member 17. Movement of the valve arm 49 is limited by a pin 51 pressed into a bore in the cover member 17.

The cover assembly 39 further includes a bi-metal element, generally designated 52 which, in the subject embodiment, is formed in the shaft of a helical coil. The inner end of the coil 52 is received in a slot formed in the outer end of the valve shaft 47, while the outer end of the coil 52 is supported by a clip assembly 53, which forms no part of the present invention, but may be made in accordance with U.S. Pat. No. 4,054,193. The clip assembly maintains the outer end of the coil 51 fixed relative to the cover member 43. The manner in which the bi-metal coil 52 operates to control the movement of the valve arm 49 is well known in the art, is not an essential feature of the present invention, and therefore, will not be described further.

The cover member 17 defines an axial passage 55 in communication with the operating chamber 37, and a radial passage 57 which provides fluid communication from the axial passage 55 to the reservoir chamber 41. Disposed adjacent the axial passage 55 is a pumping element (wiper) 59, operable to engage the relatively rotating fluid in the operating chamber 37, to generate a localized region of relatively higher fluid pressure, and continually pump a small quantity of fluid back into the reservoir chamber 41, through the passages 55 and 57, as is well known in the art.

In the subject embodiment, the rearward surface of the disc-like portion 31 of the input coupling member 11 forms a plurality of annular lands 61 which define a plurality of annular grooves therebetween. The adjacent surface of the housing member 15 forms a plurality of annular lands 63 which define a plurality of annular grooves therebetween. The lands 61 and 63 are interdigitated to define a serpentine-shaped rearward shear space therebetween. Similarly, the forward surface of the disc-like portion 31 forms a plurality of annular lands 65 which define a plurality of annular grooves therebetween. The adjacent surface of the cover member 17 forms a plurality of annular lands 67, which define annular grooves therebetween. The lands 65 and 67 are interdigitated to define a serpentine-shaped forward shear space therebetween. Although the present invention may be utilized in a fluid coupling device having various shear space configurations, it is especially advantageous in a device having a forward and a rearward shear space, and more specifically, in such a device in which both shear spaces are defined by interdigitated lands and grooves, and accordingly, the invention will be described in connection therewith.

Referring still primarily to FIG. 1, a brief description will be given of the fluid flow path during filling of the conventional form of fluid coupling device of the type shown in FIG. 1. When the valve arm 49 moves to begin uncovering the fill opening 50, fluid flows from the reservoir chamber 41 into the operating chamber 37. Of the fluid entering the operating chamber 37, the major portion remains forward of the web portion 33, with only a small portion passing through the openings 35 into the region of the chamber 37 rearward of the web portion 33.

As was mentioned in the background of the present specification, prior art fluid coupling devices have relied primarily upon radially extending grooves (grooves 70 and 72 in U.S. Pat. No. 3,972,399) to achieve filling of the shear space. However, the relatively small portion of the fluid in the operating chamber 37, rearward of the web portion 33, is insufficient to completely fill the shear space defined by the lands 61 and 63. As a result, in order to achieve complete filling of the rearward shear space, it has been necessary in the conventional design for fluid forward of the web portion 33 to flow radially outward, filling the shear space defined by the lands 65 and 67, eventually reaching the OD of the disc-like portion 31, then flowing axially rearward along the OD, and finally, flowing radially inwardly to fill the portion of the shear space defined by the outermost lands 61 and 63. It should be noted that the fill path just described requires a major portion of the fluid to flow past the pumping element 59, with the result that a substantial portion of the fluid is pumped back into the reservoir chamber 41, through the passages 55 and 57, as described previously, before the shear space is completely filled. Because, in the conventional design, the flow capacity through the fill opening 50 is greater than the flow back to the reservoir generated by the pumping element 59, the entire shear space may eventually become filled, and remain filled. However, for a series of devices utilizing the conventional fill path just described, there are two distinct advantages. First, the average response time is excessive, because of the quantity of fluid being diverted to the reservoir during filling. It should also be noted that in regard to the shear space defined by the outermost lands 61 and 63, the response time is increased merely by the length of the flow path over which the fluid must travel. Secondly, because of variations in such factors as groove depth and wiper efficiency, response time from one coupling device to the next varies excessively.

As was indicated above, even with the conventional fill path, the entire shear space may become filled. However, in addition to the problems related to the length and the lack of consistency of the response time, it should also be noted that the conventional fill path imposes limitations on the torque of the fan being driven by the device, and on the viscosity of the fluid being utilized in the device. It has been hypothesized that, for a given coupling device, an increased fan torque will increase the rate of pump-out (scavenge) caused by the wiper 59, but will not effect the fill rate. Therefore, in order to use a higher torque fan, it would be necessary that the coupling device be able to fill more rapidly, consistent with the higher pump-out rate. Similarly, it has been hypothesized that, for a given coupling device, an increased fluid viscosity may slightly reduce pump-out rate, but will reduce the fill rate even more. Therefore, in order to use a higher viscosity fluid, it would be necessary that the coupling device be able to maintain nearly the same fill rate, despite the higher viscosity.

Figure 2:
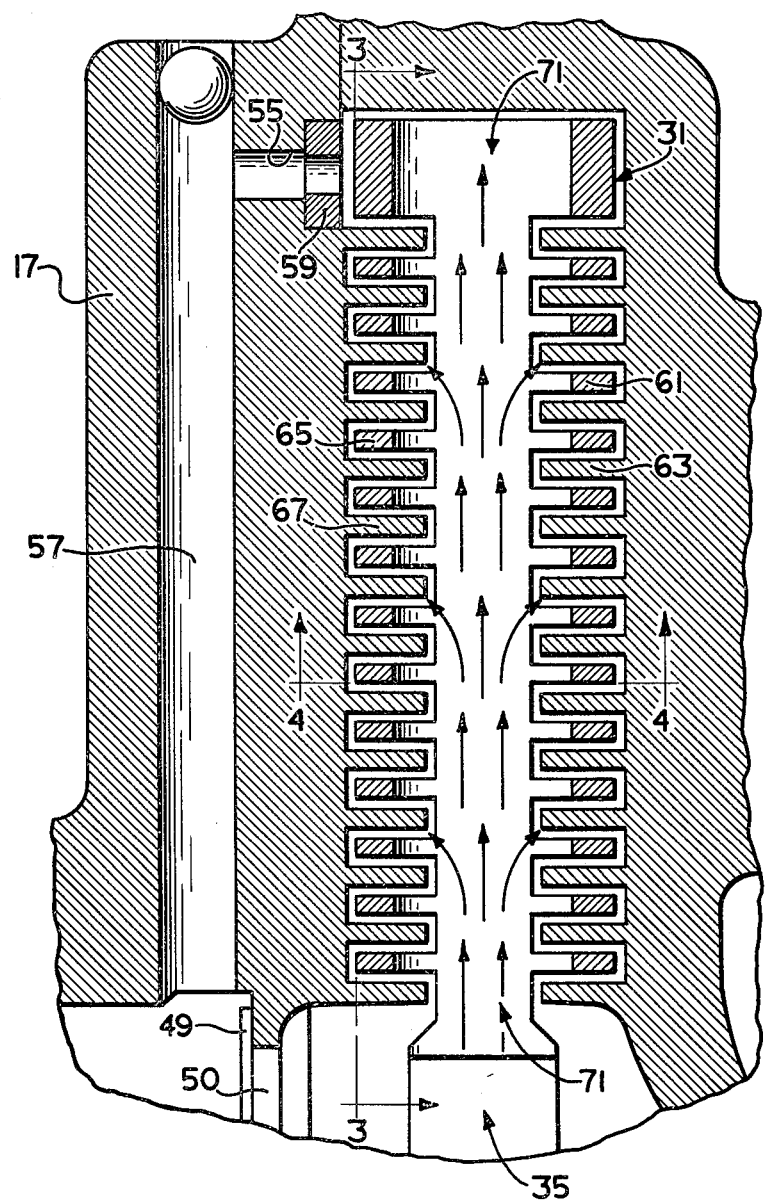
FIG. 2 is an enlarged, fragmentary view, similar to FIG. 1, with the input coupling member rotated about 60 degrees from the position shown in FIG. 1.
Figure 3:
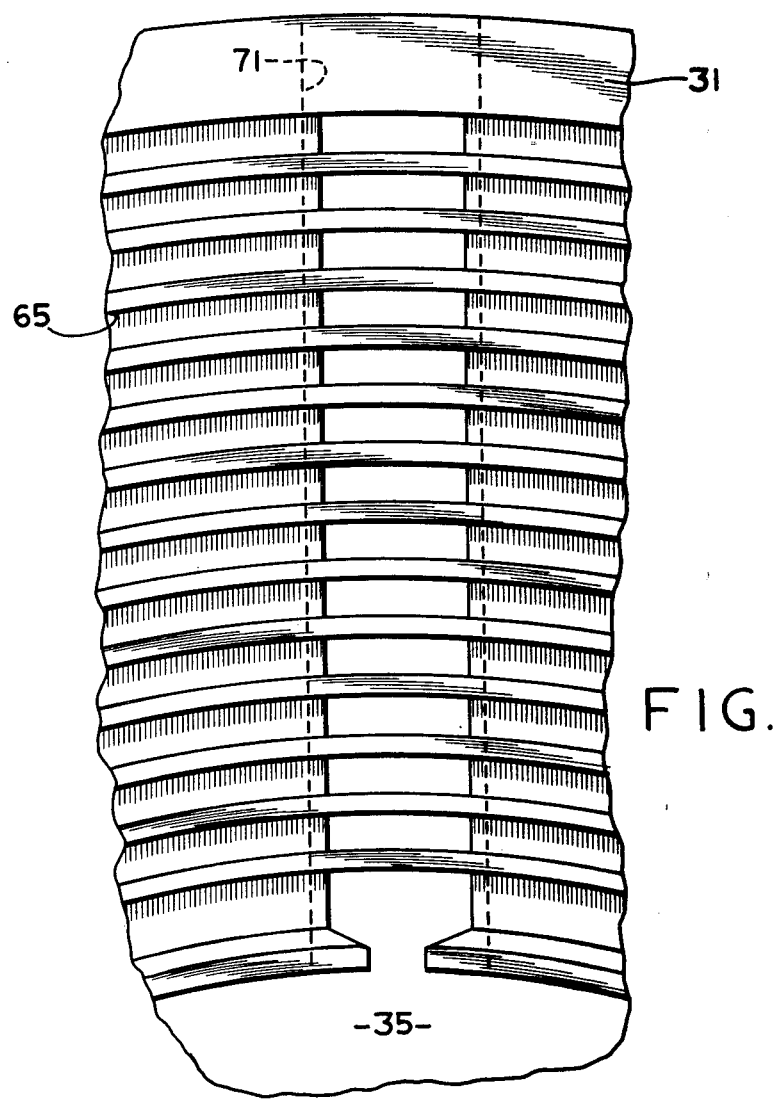
FIG. 3 is a fragmentary, front plan view of the input coupling member, taken on line 3—3 of FIG. 2, and on the same scale.
Figure 4:
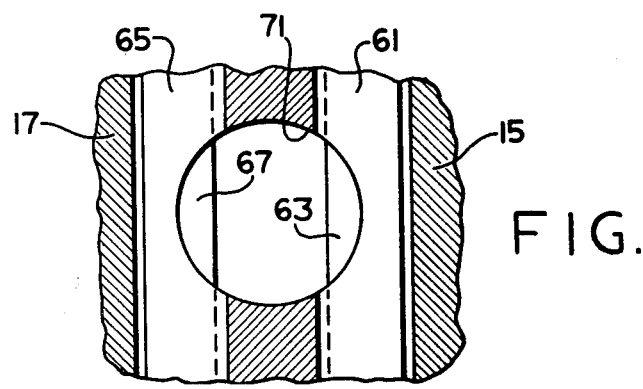
FIG. 4 is a fragmentary cross section, taken on line 4—4 of FIG. 2, and on the same scale.

Referring now primarily to FIG. 2, and also to FIGS. 3 and 4, the present invention is illustrated in some detail. In FIG. 2, the output coupling assembly 13 is shown on the same plane as in FIG. 1, but the input coupling member 11 is "rotated" approximately 60 degrees from the position of the member 11 shown in FIG. 1.

The present invention provides fluid passage means operable to communicate fluid from the portion of the operating chamber 37 adjacent the fill opening 50 into the shear space, without the shear space itself actually comprising a major portion of the passage means. In addition, the passage means provides substantially less restriction to fluid flow than the fill path of the prior art, thus improving not only the response time of the device, but also the consistency of the response time. In the subject embodiment, the passage means comprises at least one radially-extending passage 71 communicating between the inner radial periphery of the disc-like portion 31, and the outer radial periphery of the portion 31. The passage 71 communicates at least intermittently with both the forward and rearward shear areas over at least a major portion of the radial extent of each of the shear areas. It should be noted that each of the passages 71 is in open communication with each of the grooves defined by the lands 61, and at the same time, is in open communication with each of the grooves defined by the lands 65 (see FIG. 3).

In the subject embodiment, the portion 31 defines three of the passages 71, uniformly spaced circumferentially, and oriented circumferentially such that each of the passages 71 opens into one of the openings 35 formed in the web portion 33 (FIG. 3). In the subject embodiment, all of the passages 71 are formed simultaneously by drilling radially inwardly, starting from the outer periphery of the disc-like portion 31. Subsequently, the lands and grooves are machined, first on one side of the portion 31, then on the other side, with all of the machined grooves breaking through to communicate with the drilled passages 71, as described previously. Finally, the entire input coupling member 11 should be carefully deburred, especially at the intersections of the passages 71 and the machined grooves.

The ability of the present invention to communicate fluid to both the forward and rearward shear spaces quickly may best be seen by reference to FIGS. 2 and 4 wherein it is shown that the lands 63 and 67 extent into the passage 71. The lands 63 and 67 preferably do not extend far enough into the passage 71 to restrict fluid flow therethrough, but, as illustrated by the arrows in FIG. 2 each of the lands 63 and 67 is operable to "catch" a small portion of the fluid flowing radially outward through the passage 71, and divert the fluid directly into the adjacent shear space.

Although the present invention has been described with reference to a particular embodiment, it should be understood that, within the scope of the invention, many alterations and modifications of the preferred embodiment may be made. It is intended to include all such alterations and modifications, insofar as they come within the scope of the appended claims, or the range of equivalence thereof.

What is claimed is:

1. A fluid coupling device comprising a first rotatable coupling assembly defining an axis of rotation, enclosure means associated with said first rotatable coupling assembly to define a fluid chamber therebetween, valve means associated with said first rotatable coupling assembly and disposed to separate said fluid chamber into a fluid operating chamber and a fluid reservoir chamber, a second rotatable coupling member disposed in said fluid operating chamber and being rotatable relative to said first rotatable coupling assembly, said valve means being operable to control the flow of fluid between said reservoir and said operating chamber, and including means associated with said valve means to effect the operation thereof in response to variations in a predetermined condition, said second coupling member including a hub portion and a disc-like portion, said disc-like portion having first and second axially-spaced surfaces, said first surface cooperating with the adjacent surface of said first coupling assembly to define a first viscous shear space, said second surface cooperating with with the adjacent surface of said first coupling assembly to define a second viscous shear space, said disc-like portion defining at least one fluid passage communicating between the inner radial periphery of said disc-like portion and the outer radial periphery thereof, said fluid passage communicating at least intermittently with each of said first and second viscous shear spaces over at least a major portion of the radial extent of said shear spaces, said first viscous shear space and said second viscous shear space being substantially uninterrupted by said fluid passage.

2. A fluid coupling device as claimed in claim 1 wherein said first surface of said disc-like portion forms a plurality of annular lands, defining a plurality of annular grooves therebetween, said fluid passage being in open fluid communication with said plurality of annular grooves.

3. A fluid coupling device as claimed in claim 2 wherein said adjacent surface of said first coupling assembly, adjacent said first surface of said disc-like portion, forms a plurality of annular lands interdigitated with said lands formed by said first surface to comprise said first viscous shear space.

4. A fluid coupling device as claimed in claim 1 or 2 wherein said second surface of said disc-like portion forms a plurality of annular lands, defining a plurality of annular grooves therebetween, said fluid passage being in open fluid communication with said plurality of annular grooves.

5. A fluid coupling device as claimed in claim 3 wherein said adjacent surface of said first coupling assembly, adjacent said second surface of said disc-like portion, forms a plurality of annular lands interdigitated with said lands formed by said second surface to comprise said second viscous shear space.

6. A fluid coupling device as claimed in claim 1 wherein said fluid passage is oriented radially.

7. A fluid coupling device as claimed in claim 1 or 6 wherein said fluid passage comprises a machined bore of generally circular cross-section.

8. A fluid coupling device as claimed in claim 1 including a plurality of said fluid passages, oriented radially, and uniformly spaced circumferentially.

9. A fluid coupling device as claimed in claim 8 wherein said second coupling member includes a web portion disposed radially between said hub portion and said disc-like portion, said web portion defining a plurality of openings, each of said plurality of fluid passages being circumferentially aligned with one of said plurality of openings.

10. A fluid coupling device as claimed in claim 1 wherein said valve means is disposed to permit fluid flow into said operating chamber at a location disposed radially inward from said first and second shear spaces.

11. A fluid coupling device as claimed in claim 1 or 10 wherein said valve means includes pumping means operable to pump fluid from said operating chamber to said reservoir chamber, said pumping means being in fluid communication with said operating chamber adjacent the outer radial periphery of one of said first and second shear spaces.

12. A fluid coupling device comprising a rotatable output coupling assembly including a housing member and a cover member, said members cooperating to define a fluid chamber therebetween, valve means associated with said cover member to separate said fluid chamber into a fluid operating chamber and a fluid reservoir chamber, an input coupling member disposed in said fluid operating chamber and being rotatable relative to said output coupling assembly, said valve means being operable to control the flow of fluid between said reservoir chamber and said operating chamber, and including means associated with said valve means to effect the operation thereof in response to variations in a predetermined temperature condition, said input coupling member including a hub portion and a disc-like portion, said disc-like portion having forward and rearward axially-spaced surfaces, said forward surface and the adjacent surface of said cover member each forming a plurality of annular lands and grooves which are interdigitated to define a forward shear space, said rearward surface and the adjacent surface of said housing member each forming a plurality of annular lands and grooves which are interdigitated to define a rearward shear space, said disc-like portion defining a plurality of radially-extending fluid passages, each of said fluid passages communicating between the inner radial periphery of said disc-like portion and the outer radial periphery thereof, each of said fluid passages being in fluid communication with each of said grooves defined by the lands formed by said forward surface, and with each of said grooves defined by the lands formed by said rearward surface, said forward lands and grooves and said rearward lands and grooves being substantially uninterrupted by said radially-extending fluid passages.

13. A fluid coupling device comprising a first rotatable coupling assembly defining an axis of rotation, enclosure means associated with said first rotatable coupling assembly to define a fluid chamber therebetween, valve means associated with said first rotatable coupling assembly and disposed to separate said fluid chamber into a fluid operating chamber and a fluid reservoir chamber, a second rotatable coupling member disposed in said fluid operating chamber and being rotatable relative to said first rotatable coupling assembly, said valve means being operable to control the flow of fluid between said reservoir and said operating chamber, and including means associated with said valve means to effect the operation thereof in response to variations in a predetermined condition, said second coupling member including a hub portion and a disc-like portion, said disc-like portion having first and second axially-spaced surfaces, said first surface cooperating with the adjacent surface of said first coupling assembly to define a first viscous shear space, said second surface cooperating with with the adjacent surface of said first coupling assembly to define a second viscous shear space, said disc-like portion defining at least one fluid passage communicating between the inner radial periphery of said disc-like portion and the outer radial periphery thereof, said fluid passage communicating at least intermittently with each of said first and second viscous shear spaces over at least a major portion of the radial extent of said shear spaces, said fluid passage comprising a machined bore of generally circular cross-section.

* * * * *